(12) United States Patent
Sakuma (10) Patent No.: US 8,068,953 B2
(45) Date of Patent: Nov. 29, 2011

(54) DRIVING SKILL JUDGING APPARATUS, VARIABLE STEERING APPARATUS, VEHICLE AND DRIVING SKILL JUDGING METHOD

(75) Inventor: Tsuyoshi Sakuma, Kawasaki (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 882 days.

(21) Appl. No.: 12/149,356

(22) Filed: Apr. 30, 2008

(65) Prior Publication Data

US 2008/0281486 A1   Nov. 13, 2008

(30) Foreign Application Priority Data

May 7, 2007 (JP) .................................. 2007-122135

(51) Int. Cl.
*B62D 5/00* (2006.01)
(52) U.S. Cl. ............. 701/41; 180/443; 340/439; 701/42
(58) Field of Classification Search .................. 180/443; 340/439; 434/64–66; 701/29, 35, 41, 42
See application file for complete search history.

(56) References Cited

U.S. PATENT DOCUMENTS

| | | | | | |
|---|---|---|---|---|---|
| 5,172,785 | A | * | 12/1992 | Takahashi | 180/271 |
| 5,991,675 | A | * | 11/1999 | Asanuma | 701/41 |
| 7,649,445 | B2 | * | 1/2010 | Kuramori et al. | 340/439 |
| 2007/0213886 | A1 | * | 9/2007 | Zhang et al. | 701/1 |

FOREIGN PATENT DOCUMENTS

| | | | |
|---|---|---|---|
| JP | 0405077 | A * | 2/1992 |
| JP | 08150914 | A * | 6/1996 |
| JP | 2002-154346 | A | 5/2002 |
| JP | 2003-083108 | A | 3/2003 |
| JP | 2005-077788 | A | 3/2005 |
| JP | 2006111098 | A * | 4/2006 |
| JP | 2006111226 | A * | 4/2006 |
| JP | 2006-232173 | A | 9/2006 |
| JP | 2006232172 | A * | 9/2006 |
| JP | 2006232174 | A * | 9/2006 |

OTHER PUBLICATIONS

T. Flash et al., "The Coordination of Arm Movements: An Experimentally Confirmed Mathematical Model," The Journal of Neuroscience, vol. 5, No. 7, Jul. 1985, pp. 1688-1703.

* cited by examiner

*Primary Examiner* — Paul N Dickson
*Assistant Examiner* — Laura Freedman
(74) *Attorney, Agent, or Firm* — Foley & Lardner LLP

(57) ABSTRACT

A driving skill judging apparatus for a vehicle includes: a steering angle detecting section configured to detect a steering angle of the vehicle; a high order function calculating section configured to calculate a high order function of a third order or more, and which is for approximating a transition state of the steering angle based on the steering angle detected by the steering angle detecting section; and a skill judging section configured to judge a driving skill based on a comparative result between a transition state of the steering angle detected by the steering angle detecting section and the high order function calculated by the high order function calculating section.

14 Claims, 8 Drawing Sheets

[Page omitted — patent front matter / summary.]

DRIVING SKILL JUDGING APPARATUS, VARIABLE STEERING APPARATUS, VEHICLE AND DRIVING SKILL JUDGING METHOD

BACKGROUND OF THE INVENTION

This invention relates to a driving skill judging apparatus, a variable steering apparatus, a vehicle and a driving skill judging method.

A published patent application publication No. 2006-232173 shows a judging apparatus configured to estimate an ideal steering angle with respect to road alignments and so on, to detect a steering error with respect to the ideal steering angle by a deviation between an actual steering angle and the ideal steering angle, to detect an adjustment steering by the steering error, and to judge a driving skill based on the magnitude and the frequency of the adjustment steering.

SUMMARY OF THE INVENTION

However, the above-described judging apparatus needs the detection of the road alignments, and accordingly the structure of the apparatus may be complicated. It is an object of the present invention to provide a driving skill judging apparatus, a variable steering apparatus, a vehicle and a driving skill judging method which are devised to achieve judgment of the driving skill by a simple construction.

According to one aspect of the present invention, a driving skill judging apparatus for a vehicle includes: a steering angle detecting section configured to detect a steering angle of the vehicle; a high order function calculating section configured to calculate a high order function of a third order or more, and which is for approximating a transition state of the steering angle based on the steering angle detected by the steering angle detecting section; and a skill judging section configured to judge a driving skill based on a comparative result between a transition state of the steering angle detected by the steering angle detecting section and the high order function calculated by the high order function calculating section.

According to another aspect of the invention, a variable steering apparatus for a vehicle includes: a steering angle detecting section configured to detect a steering angle of the vehicle; a high order function calculating section configured to calculate a high order function of a third order or more, and which is for approximating a transition state of the steering angle based on the steering angle detected by the steering angle detecting section; a skill judging section configured to judge a driving skill based on a comparative result between a transition state of the steering angle detected by the steering angle detecting section and the high order function calculated by the high order function calculating section; and a variable gear ratio steering device arranged to control a ratio between the steering angle and an actual steering angle based on the judgment result of the driving skill by the skill judging section.

According to still another aspect of the invention, a variable steering apparatus for a vehicle includes: a steering angle detecting section configured to detect a steering angle of the vehicle; a high order function calculating section configured to calculate a high order function of a third order or more, and which is for approximating a transition state of the steering angle based on the steering angle detected by the steering angle detecting section; a skill judging section configured to judge a driving skill based on a comparative result between a transition state of the steering angle detected by the steering angle detecting section and the high order function calculated by the high order function calculating section; and an electromotive power steering device arranged to assist a steering force, and to set a characteristic of the assist of the steering force based on the judgment result of the driving skill by the skill judgment section.

According to still another aspect of the invention, a vehicle includes: a steering wheel; a steering angle detecting section configured to detect a steering angle of the steering wheel; a high order function calculating section configured to calculate a high order function of a third order or more, and which is for approximating a transition state of the steering angle based on the steering angle detected by the steering angle detecting section; and a skill judging section configured to judge a driving skill based on a comparative result between a transition state of the steering angle detected by the steering angle detecting section and the high order function calculated by the high order function calculating section.

According to still another aspect of the invention, a driving skill judging method for a vehicle includes: detecting a steering angle of the vehicle; calculating a high order function of a third order or more, and which is for approximating a transition state of the steering angle based on the steering angle; and judging a driving skill based on a comparative result between a transition state of the steering angle detected by the steering angle detecting section and the high order function.

DETAILED DESCRIPTION OF THE INVENTION

Figure 1:
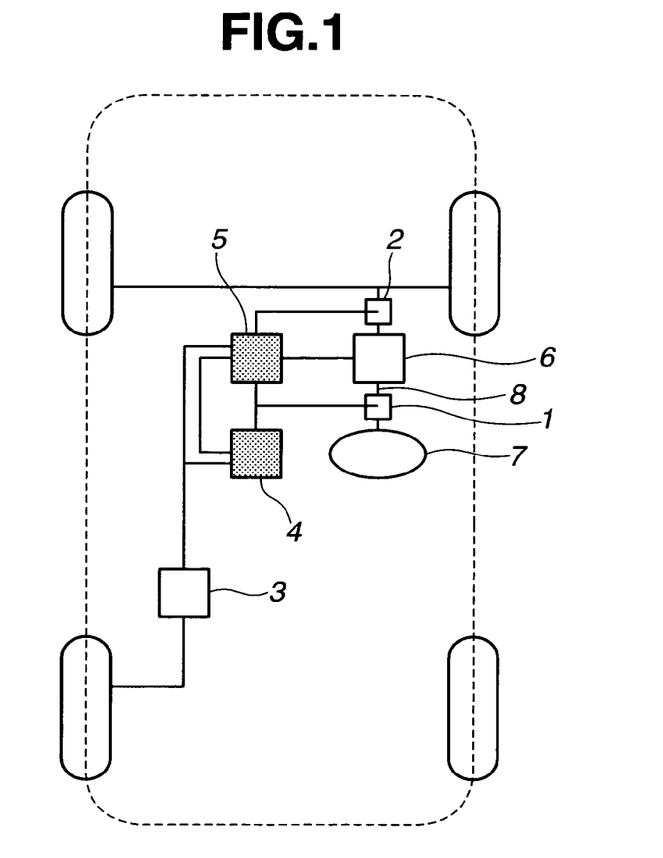
FIG. 1 is a schematic view showing a vehicle according to one embodiment of the present invention.

FIG. 1 is a schematic view showing a vehicle according to one embodiment. The vehicle includes a steering angle sensor 1, an output angle sensor 2, a vehicle speed sensor 3, a driving skill judgment calculation device 4, a variable steering angle calculation unit 5, and a variable steering angle mechanism 6. Steering angle sensor 1 is arranged to detect a steering angle of a steering wheel 7, and to output that detection result to variable steering angle calculation unit 5 and variable steering angle mechanism 6. Output angle sensor 2 is arranged to detect an output angle of a steering shaft 8, and to output that detection result to variable steering angle calculation unit 5 and variable steering angle mechanism 6. Vehicle sensor 3 is arranged to detect a running speed of the vehicle, and to output that detection result to variable steering angle calculation unit 5 and variable steering angle mechanism 6.

Driving skill judgment calculation device 4 is arranged to perform a steering angular speed calculation process described later, to obtain the steering angle detected by steering angle sensor 1, and to calculate a steering angular speed. Moreover, driving skill judgment calculation device 4 is arranged to perform a driving skill judging process described later, and to detect a steering start point indicating that the steering is started, and a steering target point indicating that the steering is returned, based on the steering angle and the steering angular speed calculated by the steering angular speed calculating process. Moreover, driving skill judgment calculation device 4 is arranged to calculate a cubic function and a quintic function for approximating a transition state of the steering angle based on a record (historical data) of the steering angle from the steering start point to the steering target point. Driving skill judgment calculation device 4 is arranged to calculate a difference between the cubic function and the record of the steering angle, and a difference between the quintic function and the record of the steering angle, to judge the driving skill based on these differences, and to output the judgment result to variable steering angle mechanism 6.

Figure 2:
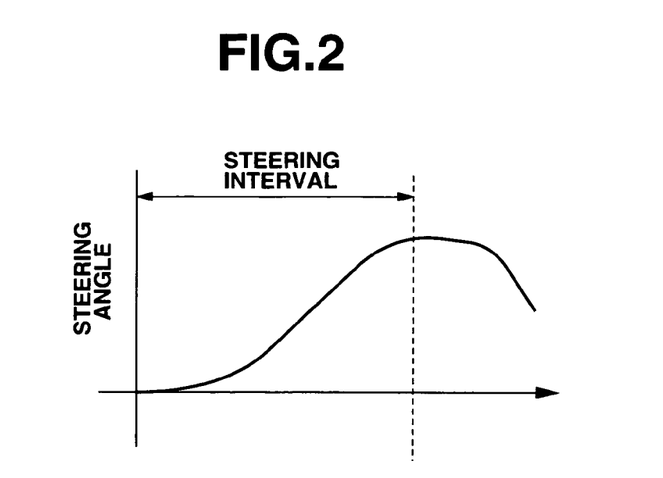
FIG. 2 is an illustration view for illustrating a movement of a steering angle.

That is, in a steering interval from the steering start point to the steering target point, the steering angular speed increases from zero, and then decreases to zero as shown in FIG. 2. Accordingly, a steering angular acceleration varies with the time from a positive value to a negative value. It is necessary for the steering angle to be three time differentiable. The function for approximating the transition state of the steering angle is the cubic function of degree three at the minimum. Moreover, by minimum jerk theory (Flash, T., Hogan, N. 1985. The Coordination of Arm movements: An Experimentally Confirmed Mathematical Model. J. Neurosci., 5, 1688-1703.), it is known that most natural movement of the human draws orbits that sum of squares of third order differential value of the positions from the start to the end of the movement is minimized. Therefore, the human acts the natural movement when the human steers so that the following equation (1) is minimized. In this case, it is possible to represent the steering angle as the quintic function.

$$\sum \left\{ \left( \frac{d}{dt} \right)^3 \theta(t) \right\}^2 \tag{1}$$

Variable steering angle mechanism 6 is configured to set a ratio of an output angle (actual steering angle) to an input angle of steering shaft 8 (the steering angle of steering wheel 7), in accordance with the detection results outputted from steering angle sensor 1, output angle sensor 2 and vehicle speed sensor 3. Moreover, variable steering angle mechanism 6 is configured to set a characteristic (steering angle variable algorism) of the ratio of the output angle to the input angle of steering shaft 8, to a value suitable for the driving skill.

Figure 3A:
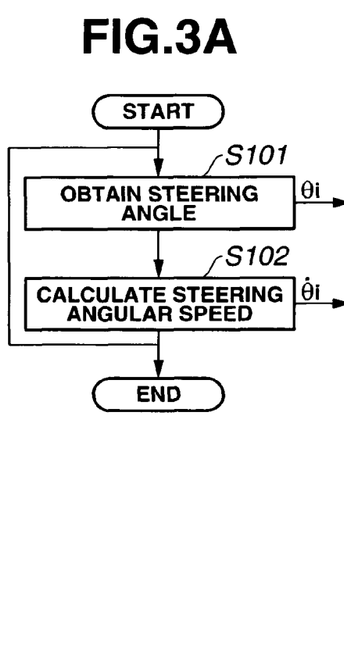
FIGS. 3A and 3B are flowcharts showing a steering angular speed calculation process and a driving skill judgment process.

<Operation of Driving Skill Judgment Calculation Device> FIG. 3A is a flowchart showing a steering angular speed calculation process. In the steering angular speed calculation process shown in FIG. 3A, driving skill judgment calculation device 4 obtains information of steering angle θi detected by steering angle sensor 1 at step S101, and the process proceeds to step S102 At step S102 following step S101, driving skill judgment calculation device 4 calculates dθi/dt (steering angular speed) based on steering angle θi obtained at step S101, and then the process proceeds to step S101.

Figure 3B:
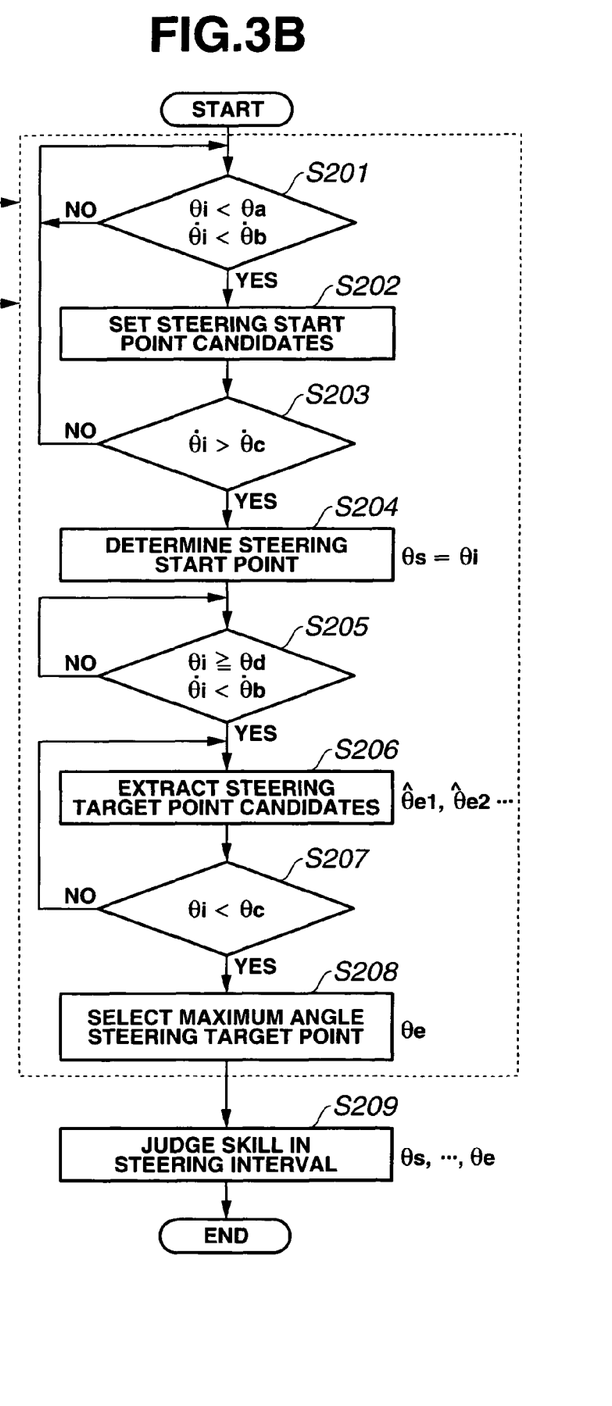

FIG. 3B is a flowchart showing a driving skill judgment calculation process performed by driving skill judgment calculation device 4. In the driving skill judgment process shown in FIG. 3B, driving skill judgment calculation device 4 judges whether or not the driver stops the steering at step S201, that is, judges whether or not steering angle θi is smaller than a first setting value θa and dθi/dt is smaller than a second setting value dθb/dt (θi<θa, dθi/dt<dθb/dt). When the answer of step S201 is YES (θi<θa and dθi/dt<dθb/dt), the process proceeds to step S202. When the answer of step S201 is NO (θi≧θa or dθi/dt≧dθb/dt), the process repeats step S201.

Figure 4A:
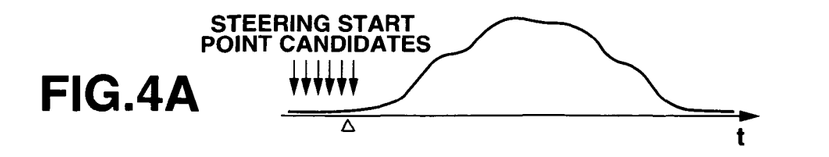
FIGS. 4A~4E are illustration views for illustrating an operation of a driving skill judgment calculation device.

At step S202 following step S201, driving skill judgment calculation device 4 sets steering angles θi obtained by the steering angular speed calculation process, to steering start point candidates as shown in FIG. 4A. At step S203 following step S202, driving skill judgment calculation device 4 judges whether or not the driver is steering, that is, judges whether or not steering angular speed dθi/dt is greater than a third setting value dθc/dt. When the answer of step S203 is YES (dθi/dt>dθc/dt), the process proceeds to step S204. When the answer of step S203 is NO (dθi/dt≦dθc/dt), the process proceeds to step S201.

Figure 4B:
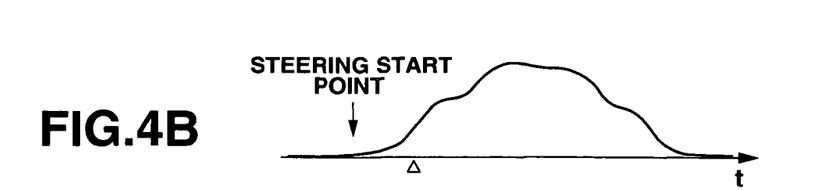

At step S204 following step S203, driving skill judgment calculation device 4 sets, to a steering start point θs, one steering angle θi set to the steering start point candidates at step S202, as shown in FIG. 4B. At step S205 following step S204, driving skill judgment calculation device 4 judges whether or not the steering angle reaches a maximum value, that is, judges whether or not the steering angle θi is equal to or greater than a fourth setting value θd and the steering angular speed dθi/dt is smaller than second setting value dθb/dt (θi≧θd, dθi/dt<dθb/dt). When the answer of step S205 is YES (θi≧θd and dθi/dt<dθb/dt), the process proceeds to step S206. When the answer of step S205 is NO (θi<θd or dθi/dt≧dθb/dt), the process repeats step S205.

Figure 4C:
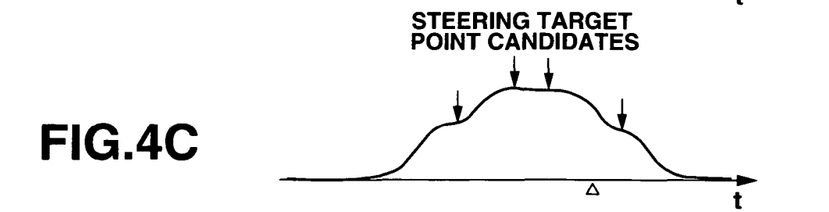

At step S206 following step S205, driving skill judgment calculation device 4 sets (adds) steering angles θi obtained by the steering angular speed calculating process, to steering target point candidates as shown in FIG. 4C. At step S207 following step S206, driving skill judgment calculation device 4 judges whether or not the steering angle θi is smaller than third setting value θc (θi<θc). When the answer of step S207 is YES (θi<θc), the process proceeds to step S208. When the answer of step S207 is NO (θi≧θc), the process proceeds to step S206.

Figure 4D:
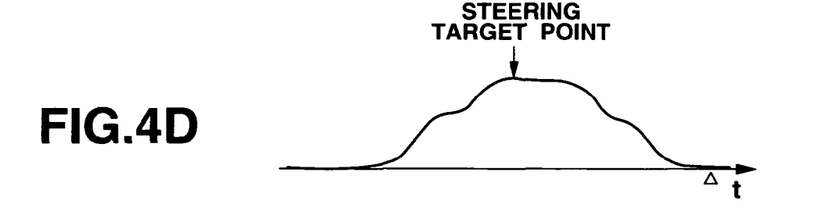
Figure 4E:
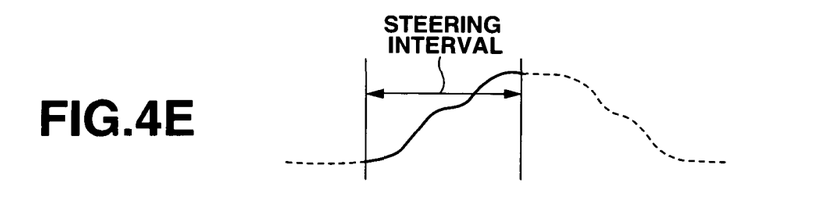
Figure 5:
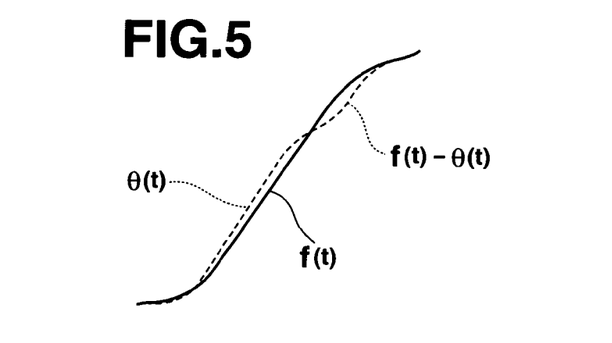
FIG. 5 is an illustrative view for illustrating a residual between a high order function and a record of a steering angle.

At step S208, driving skill judgment calculation device 4 sets, to steering target point θe, maximum one of the steering target point candidates set at step S206, as shown in FIG. 4D. At step S209 following step 208, driving skill judgment calculation device 4 calculates (determines) the cubic function and the quintic function for approximating the transition state of the steering angle based on the record θs~θe of the steering angles in the steering interval from steering start point θs set at step S204 to steering target point θe set at step S208. For example, in case of calculating the cubic function, as shown in FIG. 5, square of the residual between cubic function $f_3$ with unknown coefficients and the record θs~θe of the steering angles is represented as follows.

$$\sum_{j=s}^{e} \{f_3(t_j) - \theta_j\}^2 \quad (2)$$

$$f_3(t) = a_3 t^3 + a_2 t^2 + a_1 t + b$$

where k is a sample number of the steering angle θi. The formula (2) is partially differentiated by coefficients b, $a_1$, $a_2$, and $a_3$, and these result are put to zero, so that the following simultaneous equations (3) are obtained.

$$\frac{\partial}{\partial b} \sum_{j=1}^{k} \{f_3(t_j) - \theta_j\}^2 = \frac{\partial}{\partial b} \sum_{j=1}^{k} \{a_3 t_j^3 + a_2 t_j^2 + a_1 t_j + b - \theta_j\}^2 \quad (3)$$

$$= \sum_{j=1}^{k} 2\{a_3 t_j^3 + a_2 t_j^2 + a_1 t_j + b - \theta_j\}$$

$$= 0$$

$$\frac{\partial}{\partial a_1} \sum_{j=1}^{k} \{f_3(t_j) - \theta_j\}^2 = \frac{\partial}{\partial a_1} \sum_{j=1}^{k} \{a_3 t_j^3 + a_2 t_j^2 + a_1 t_j + b - \theta_j\}^2$$

$$= \sum_{j=1}^{k} 2\{(a_3 t_j^3 + a_2 t_j^2 + a_1 t_j + b - \theta_j) \times t_j\}$$

$$= 0$$

$$\frac{\partial}{\partial a_2} \sum_{j=1}^{k} \{f_3(t_j) - \theta_j\}^2 = \frac{\partial}{\partial a_2} \sum_{j=1}^{k} \{a_3 t_j^3 + a_2 t_j^2 + a_1 t_j + b - \theta_j\}^2$$

$$= \sum_{j=1}^{k} 2\{(a_3 t_j^3 + a_2 t_j^2 + a_1 t_j + b - \theta_j) \times t_j^2\}$$

$$= 0$$

$$\frac{\partial}{\partial a_3} \sum_{j=1}^{k} \{f_3(t_j) - \theta_j\}^2 = \frac{\partial}{\partial a_3} \sum_{j=1}^{k} \{a_3 t_j^3 + a_2 t_j^2 + a_1 t_j + b - \theta_j\}^2$$

$$= \sum_{j=1}^{k} 2\{(a_3 t_j^3 + a_2 t_j^2 + a_1 t_j + b - \theta_j) \times t_j^3\}$$

$$= 0$$

Moreover, the equations (3) are represented in matrix representation as follows.

$$\begin{pmatrix} \sum_{j=1}^{k} 1 & \sum_{j=1}^{k} t_j & \sum_{j=1}^{k} t_j^2 & \sum_{j=1}^{k} t_j^3 \\ \sum_{j=1}^{k} t_j & \sum_{j=1}^{k} t_j^2 & \sum_{j=1}^{k} t_j^3 & \sum_{j=1}^{k} t_j^4 \\ \sum_{j=1}^{k} t_j^2 & \sum_{j=1}^{k} t_j^3 & \sum_{j=1}^{k} t_j^4 & \sum_{j=1}^{k} t_j^5 \\ \sum_{j=1}^{k} t_j^3 & \sum_{j=1}^{k} t_j^4 & \sum_{j=1}^{k} t_j^5 & \sum_{j=1}^{k} t_j^6 \end{pmatrix} \begin{pmatrix} b \\ a_1 \\ a_2 \\ a_3 \end{pmatrix} = \begin{pmatrix} \sum_{j=1}^{k} \theta_j \\ \sum_{j=1}^{k} t_j \cdot \theta_j \\ \sum_{j=1}^{k} t_j^2 \cdot \theta_j \\ \sum_{j=1}^{k} t_j^3 \cdot \theta_j \end{pmatrix} \quad (4)$$

Furthermore, the both members of the equation (4) are multiplied by inverse matrix. The coefficients b, $a_1$, $a_2$, and $a_3$ are represented by the following equation (5). Consequently, the cubic function to approximate the record θs~θe of the steering angles is calculated.

$$\begin{pmatrix} b \\ a_1 \\ a_2 \\ a_3 \end{pmatrix} = \begin{pmatrix} \sum_{j=1}^{k} 1 & \sum_{j=1}^{k} t_j & \sum_{j=1}^{k} t_j^2 & \sum_{j=1}^{k} t_j^3 \\ \sum_{j=1}^{k} t_j & \sum_{j=1}^{k} t_j^2 & \sum_{j=1}^{k} t_j^3 & \sum_{j=1}^{k} t_j^4 \\ \sum_{j=1}^{k} t_j^2 & \sum_{j=1}^{k} t_j^3 & \sum_{j=1}^{k} t_j^4 & \sum_{j=1}^{k} t_j^5 \\ \sum_{j=1}^{k} t_j^3 & \sum_{j=1}^{k} t_j^4 & \sum_{j=1}^{k} t_j^5 & \sum_{j=1}^{k} t_j^6 \end{pmatrix}^{-1} \begin{pmatrix} \sum_{j=1}^{k} \theta_j \\ \sum_{j=1}^{k} t_j \cdot \theta_j \\ \sum_{j=1}^{k} t_j^2 \cdot \theta_j \\ \sum_{j=1}^{k} t_j^3 \cdot \theta_j \end{pmatrix} \quad (5)$$

Next, a mean square En of the residual between the calculated cubic function and record θs~θe of the steering angles, and a mean square En of the residual between the calculated quintic function and record θs~θe of the steering angles are calculated by the following equation (6).

$$E_n = \sum_{j=s}^{e} \{f_n(t_j) - \theta_j\}^2 / m \quad (6)$$

where "m" represents a sample number of the steering angle.

Next, driving skill judgment calculation device 4 judges the driving skill based on the calculated mean square En of the residual, and the judgment result is outputted to variable steering angle mechanism 6. For example, driving skill judgment calculation device 4 determines the advanced driver (experienced driver) when mean square En of the residual between the cubic function $f_3$ and the record θs~θe of the steering angles is equal to or smaller than a fifth setting value, that is a setting value which is determined in advance by an experiment, a simulation and so on, and which is for judging whether the driver is the advanced driver or the intermediate driver and the beginning driver. Driving skill judgment calculation device 4 determines the intermediate driver or the beginning driver when the mean square En is greater than the fifth setting value.

Moreover, driving skill judgment calculation device 4 determines the advanced driver or the intermediate driver when mean square En of the residual between the quintic function $f_5$ and the record θs~θe of the steering angles is equal to or smaller than a sixth setting value, that is a setting value which is determined in advance by an experiment, a simulation and so on, and which is for judging the advanced driver and the intermediate driver or the beginning driver. Driving skill judgment calculation device 4 determines the beginning driver when the mean square En is greater than the sixth setting value.

That is, driving skill judgment calculation device 4 judges whether or not mean square En of the residual between cubic function $f_3$ and the record θs~θe of the steering angles is equal to or lower than the fifth setting value. Driving skill judgment calculation device 4 determines the advanced driver when the mean square En is equal to or smaller than the fifth setting value. Moreover, in the case in which the mean square En is greater than the fifth setting value, driving skill judgment calculation device 4 judges whether or not mean square En of the residual between quintic function $f_5$ and the record θs~θe of the steering angles is equal to or smaller than the sixth setting value. Driving skill judgment calculation device 4 determines the intermediate driver when the mean square En is equal to or smaller than the sixth setting value. Driving skill judgment calculation device 4 determines the begging driver when the mean square En is greater than the sixth setting value.

That is, the driver determines the steering angle from various information such as ambient environment when the driver steers. The advanced driver can predict the movement of the vehicle by the steering, changes of the surrounding circumstance. The advanced driver determines the target angle in advance, and steers from the steering start to the steering stop without adjustment of the target. Accordingly, the record of the steering angles of the advanced driver are approximated by the lower order function.

On the other hand, the beginning driver can not predict the vehicle movement and the changes of the surrounding circumstance, and adjusts the steering movement depending on the states of the time. The beginning driver adjusts the target steering angle by the information of the surrounding circumstance and the vehicle movement from the steering start to the steering stop. Therefore, it is not possible to appropriately approximate the record of the steering angles by the low order function, and the record of the steering angles of the beginning driver are approximated by the higher order function relative to the advanced driver.

Figure 6A:
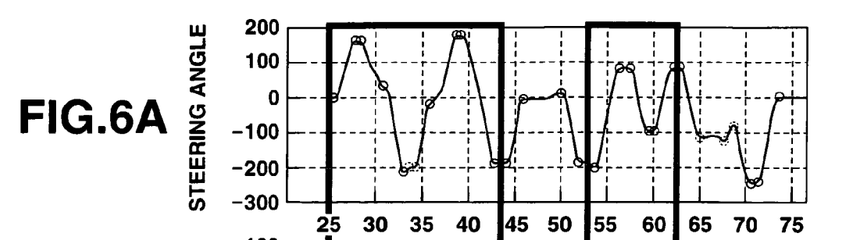
FIG. 6A is a graph showing a record of the steering angle of an advanced driver.
Figure 6B:
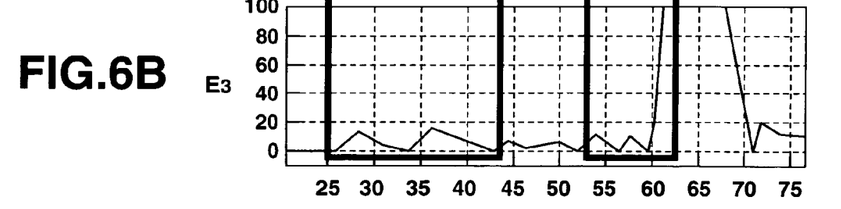
FIG. 6B is a graph showing a mean square of a residual between the record of the steering angle of the advanced driver and a cubic function.
Figure 7A:
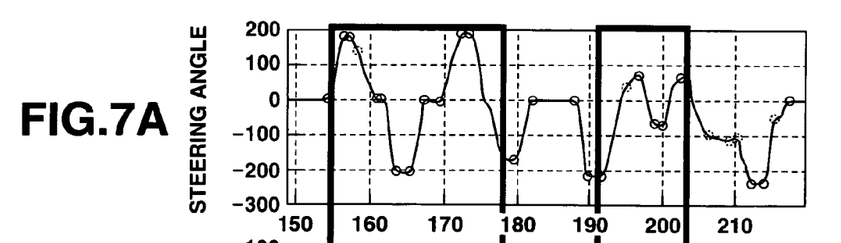
FIG. 7A is a graph showing a record of the steering angle of an intermediate driver.
Figure 7B:
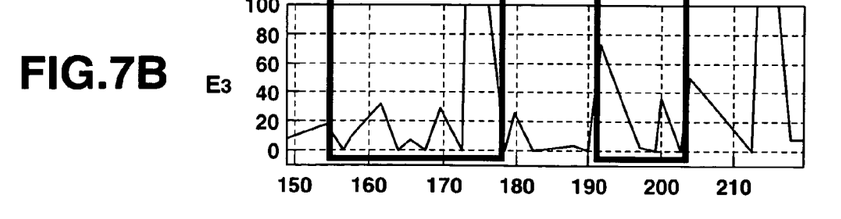
FIG. 7B is a graph showing a mean square of a residual between the record of the steering angle of the intermediate driver and a cubic function.
Figure 8A:
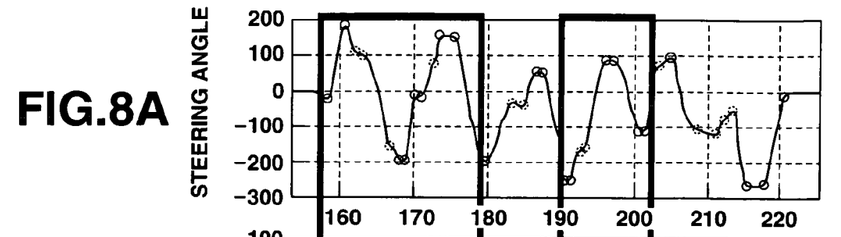
FIG. 8A is a record of the steering angle of a beginning driver.
Figure 8B:
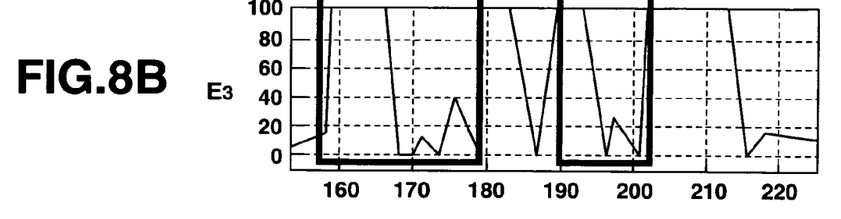
FIG. 8B is a graph showing a mean square of a residual between the record of the steering angle of the beginning driver and a cubic function.

FIG. 6A is a graph showing a record of steering angles of an advanced driver having a driving experience of 30 years when the driver drives on gradual continuous curves. FIG. 6B is a graph showing a mean square $E_3$ of a residual between the record of the steering angle of the advanced driver and a cubic function. FIG. 7A is a graph showing a record of steering angles of an intermediate driver having a driving experience of 10 years when the driver drives on the gradual continuous curves. FIG. 7B is a graph showing a mean square $E_3$ of a residual between the record of the steering angles of the intermediate driver and a cubic function. FIG. 8A is a record of steering angles of a beginning driver who is a Sunday driver when the driver drives on the gradual continuous curves. FIG. 8B is a graph showing a mean square $E_3$ of a residual between the record of the steering angles of the beginning driver and a cubic function. From these graphs, the residual of the advanced driver is small in whole (20° or below, FIG. 6B). The residual of the intermediate driver is large from the steering start point to the steering target point (FIG. 7B). The residual of the beginning driver is large in whole (FIG. 8B).

Figure 9A:
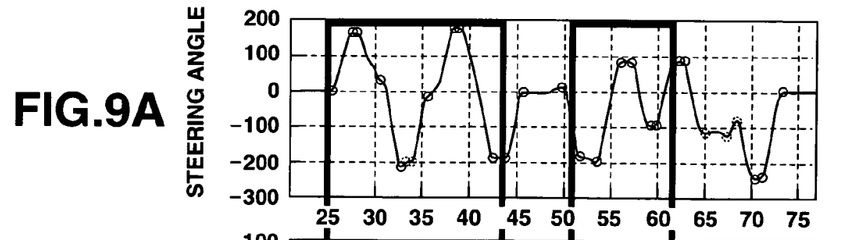
FIG. 9A is a graph showing a record of the steering angle of an advanced driver.
Figure 9B:
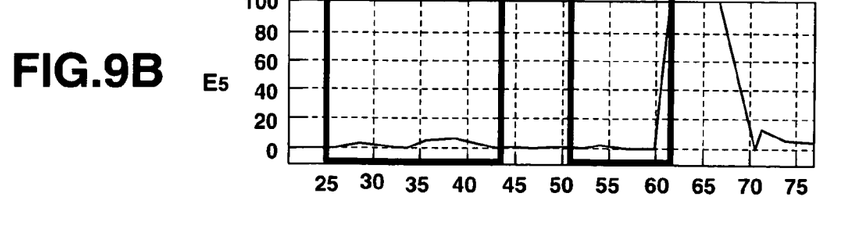
FIG. 9B is a graph showing a mean square of a residual between the record of the steering angle of the advanced driver and a quintic function.
Figure 10A:
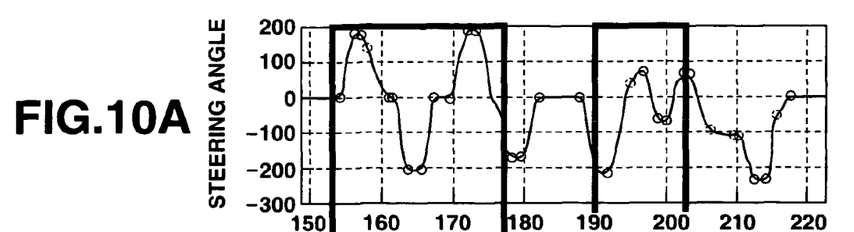
FIG. 10A is a graph showing a record of the steering angle of an intermediate driver.
Figure 10B:
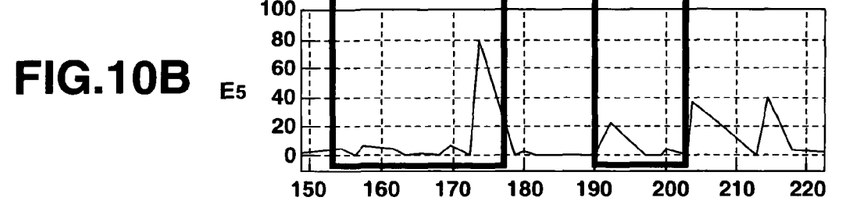
FIG. 10B is a graph showing a mean square of a residual between the record of the steering angle of the intermediate driver and a quintic function.
Figure 11A:
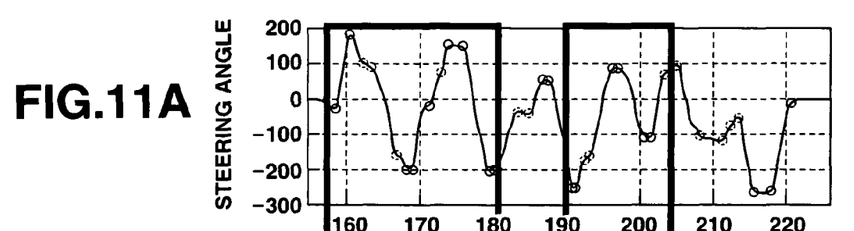
FIG. 11A is a record of the steering angle of a beginning driver.
Figure 11B:
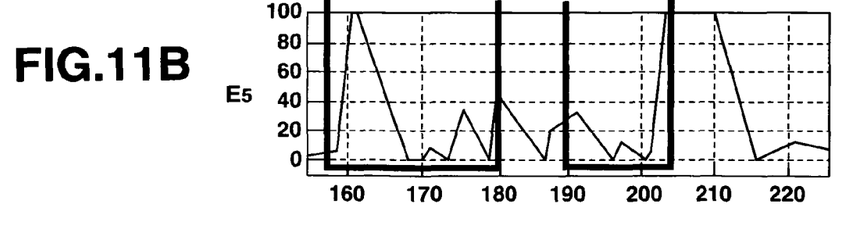
FIG. 11B is a graph showing a mean square of a residual between the record of the steering angle of the beginning driver and a quintic function.

FIG. 9A is a graph showing a record of steering angles of an advanced driver having the driving experience of 30 years when the driver drives on gradual continuous curves. FIG. 9B is a graph showing a mean square $E_5$ of a residual between the record of the steering angles of the advanced driver and a quintic function. FIG. 10A is a graph showing a record of steering angles of an intermediate driver having the driving experience of 10 years when the driver drives on the gradual continuous curves. FIG. 10B is a graph showing a mean square $E_5$ of a residual between the record of the steering angles of the intermediate driver and a quintic function. FIG. 11A is a record of steering angles of a beginning driver who is a Sunday driver when the driver drives on the gradual continuous curves. FIG. 11B is a graph showing a mean square $E_5$ of a residual between the record of the steering angles of the beginning driver and a quintic function. From these graphs, the residual of the advanced driver is small in whole (substantially zero, FIG. 9). The residual of the intermediate driver is small (FIG. 10). The residual of the beginning driver is large in whole (FIG. 11).

In this embodiment, steering angle sensor 1 of FIG. 1 corresponds to a steering angle detecting section. Driving skill judgment calculation device 4 and step S209 of FIG. 3B corresponds to a high order function calculating section and a skill judging section. Step S209 of FIG. 3B corresponds to an approximation function calculating section and a steering end point detecting section. Steps S201~S204 of FIG. 3B correspond to a steering start point sensing section. Step S208 of FIG. 3B corresponds to a steering target point detecting section. Variable steering angle mechanism 6 of FIG. 1 corresponds to a variable gear ratio steering device.

In this way, the driving skill judging apparatus according to this embodiment of the present invention includes a steering angle detecting section configured to detect a steering angle of the vehicle; a high order function calculating section configured to calculate a high order function of a third order or more, and which is for approximating a transition state of the steering angle based on the steering angle detected by the steering angle detecting section; and a skill judging section configured to judge a driving skill based on a comparative result between a transition state of the steering angle detected by the steering angle detecting section and the high order function calculated by the high order function calculating section. Therefore, it is possible to achieve the judgment of the driving skill by the simple structure, relative to the method of judging the driving skill by using the road alignments and so on.

In general, the human feels a sense of uncertainty and unpleasant feeling when the jerk (rate of change of acceleration) is large at the movement. Therefore, the human moves or acts so that the jerk becomes small, and the jerk of the movement is smaller as the driving skill is higher. The jerk of the steering angle is obtained by performing the third order derivative of the steering angle detected by steering angle sensor 1, by performing the second order derivative of the steering angular speed detected by the steering angular speed sensor, or by performing the first order derivative of the steering angular acceleration sensed by the steering angular acceleration sensor.

However, in general, the sensor outputs are a discrete-time system, and it is not possible to differentiate directly by the sensor outputs. In the discrete-time system, the pseudo-differential value is obtained by the differences between the plurality of the samples, instead of the differential. By the difference of the second order or more, the accuracy is enormously deteriorated. Therefore, it is not possible to obtain the jerk by the difference. In the embodiment according to the present invention, the high order function to approximate the transition state of the steering angle is calculated without directly calculating the jerk. The driving skill is judged based on the difference between the high order function and the steering angle, that is, based on the value indirectly indicating the magnitude of the jerk.

Moreover, it is possible to judge the driving skill when the vehicle turns right or left at the intersections, runs on the narrow winding roads, or on the urban roads, and to judge the driving skill immediately after the driving start. In a method of estimating a feature steering angle by steering entropy, detecting a steering error with respect to an ideal steering angle by deviation of the actual steering angle with respect to the estimated steering angle, determining the adjustment steering when the steering error is large, and judging the driving skill based on the frequency and the magnitude of the adjustment steering, it needs the steering record in the long time duration and the many calculations for the calculation of the steering entropy. Consequently, it needs the much time until the judgment of the driving skill is finished.

Moreover, the high order function calculating section calculates a first high order function (cubic function) of a third order or more, and a second high order function (quintic function) of an order larger than the order of the first high order function; and the skill judging section is configured to judge the driving skill based on a difference between the transition state of the steering angle and the first high order function, and a difference between the transition state of the steering angle and the second high order function.
Accordingly, it is possible to achieve the judgment of the driving skill by the simple construction, relative to the method of judging the driving skill by using the road alignments.

In the apparatus according to the embodiment, the high order function calculating section includes a steering start point detecting section configured to detect a steering start point indicating a point at which the steering is started, based on the record of the steering angle; a steering target point detecting section configured to detect a steering target point indicating a point at which the steering is returned, based on the record of the steering angle; and an approximation function calculating section configured to calculate the first high order function and the second high order function for approximating the transition state of the steering angle from the steering start point to the steering target point, based on the record of the steering angle. Accordingly, it is possible to achieve the judgment of the driving skill by the simple construction, relative to the method of judging the driving skill by using the road alignments.

Figure 12:
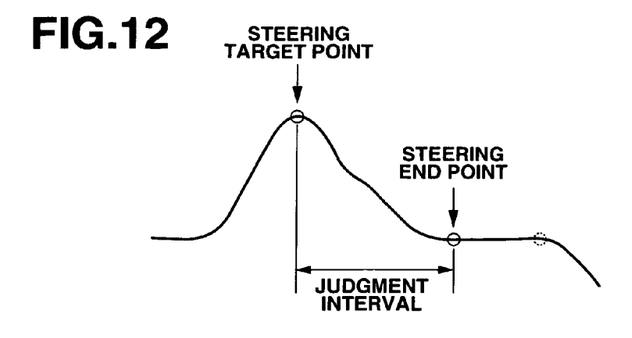
FIG. 12 is an illustrative view for illustrating a variation of a driving skill judging process according to the embodiment.

In the apparatus according to the embodiment, the high order function calculating section includes a steering target point detecting section configured to detect a steering target point indicating a point at which the steering is returned, based on the record of the steering angle; a steering end point detecting section configured to detect a steering end point indicating a point at which the steering is finished, based on the record of the steering angle; an approximation function calculating section configured to calculate the first high order function and the second high order function for approximating the transition state of the steering angle from the steering target point to the steering end point, based on the record of the steering angle, as shown in FIG. 12. Accordingly, it is possible to achieve the judgment of the driving skill by the simple construction, relative to the method of judging the driving skill by using the road alignments.

Figures 13A, 13B:
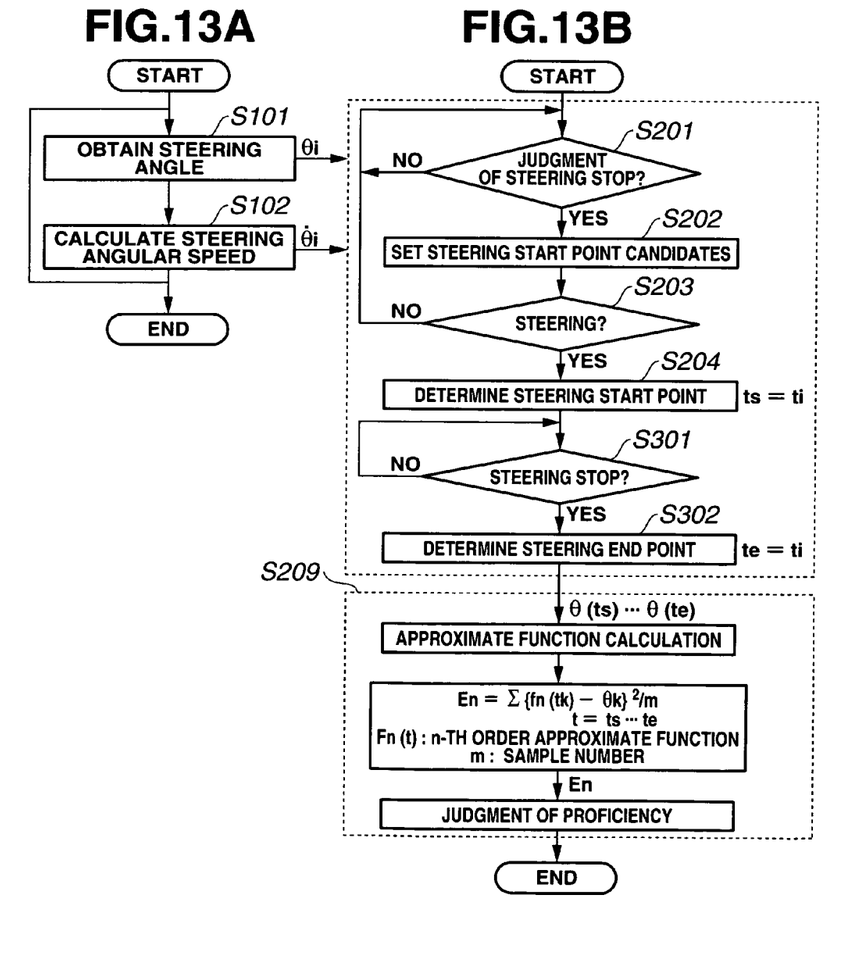
FIGS. 13A and 13B are flowcharts showing a variation of a steering angular speed calculation process and a driving skill judging process according to the embodiment.

FIG. 13 is a flowchart showing a variation of a steering angular speed calculation process and a driving skill judging process according to the embodiment. As shown in FIG. 13, driving skill judgment calculation device detects the steering start point from the record of the steering angles (step S201~S204), detects the steering end point from the record of the steering angles (step S301), and calculates the first high order function and the second high order function for approximating the transition state of the steering angle from the steering start point to the steering end point (step S209). Accordingly, it is possible to achieve the judgment of the driving skill by the simple construction, relative to the method of judging the driving skill by using the road alignments.

In the apparatus according to the embodiment, the first high order function is a cubic function; and the second high order function is a quintic function. Accordingly, it is possible to estimate the variation of the jerk by the cubic function, and to estimate the degree of the suppression of the variation of the jerk. Therefore, it is possible to simplify the judgment algorism. the steering start point detecting section determines the steering start point when an absolute value of variation speed of the steering angle becomes greater than a third threshold value (third setting value) from a state in which the absolute value of the steering angle is smaller than a first threshold value (first setting value) and the absolute value of the variation speed of the steering angle is smaller than a second threshold value (second setting value). Accordingly, it is possible to detect that the vehicle running the straight road turns right or left on the intersections, and approaches the curve road. Therefore, it is possible to appropriately obtain only the data of the steering angle at the steering.

In the apparatus according to the embodiment, the steering end point detecting section determines the steering end point when an absolute value of a variation quantity of the steering angle becomes smaller than a sixth threshold value from a state in which the absolute value of the steering angle is smaller than a fourth threshold value and the absolute value of the variation speed of the steering angle is greater than a fifth threshold value. Accordingly, it is possible to appropriately detect that the vehicle turns right or left on the intersections, and returns from the curve road to the straight road.

In the apparatus according to the embodiment, the steering target point sensing section determines the steering target point when the steering angle is maximized. Accordingly, it is possible to prevent the deterioration of the judgment accuracy of the driving skill by change of steering strategies when the steering wheel is steered to the target point, and when the steering wheel is returned. Therefore, it is possible to improve the judgment accuracy of the driving skill. Moreover, the high order function calculating section is configured to calculate the high order function by least square method, based on the steering angle. Accordingly, it is possible to decrease the calculation for determining the high order function, and to improve the judgment speed of the driving skill.

In the apparatus according to the embodiment, the skill judging section is configured to judge the driving skill based on mean square of difference between the transition state of the steering angle and the high order function. Accordingly, it is possible to judge the driving skill concurrently with the determination (calculation) of the high order function. Moreover, it is possible to eliminate the influence of the time period of the steering, and to prevent the deterioration of the judgment accuracy which is caused by the difference of the road alignments. Therefore, it is possible to improve the judgment speed and the judgment accuracy of the driving skill.

The variable steering apparatus according to the embodiment is arranged to control a ratio between the steering angle and an actual steering angle based on the judgment result of the driving skill. Accordingly, it is possible to judge the driving skill by using the steering angle sensor which is originally provided to the variable gear ratio steering device, and to change the steering angle variable algorism in accordance with the judgment result of the driving skill. Therefore, it is possible to attain the steering apparatus to perform the steering near the feeling of the driver.

Figure 14:
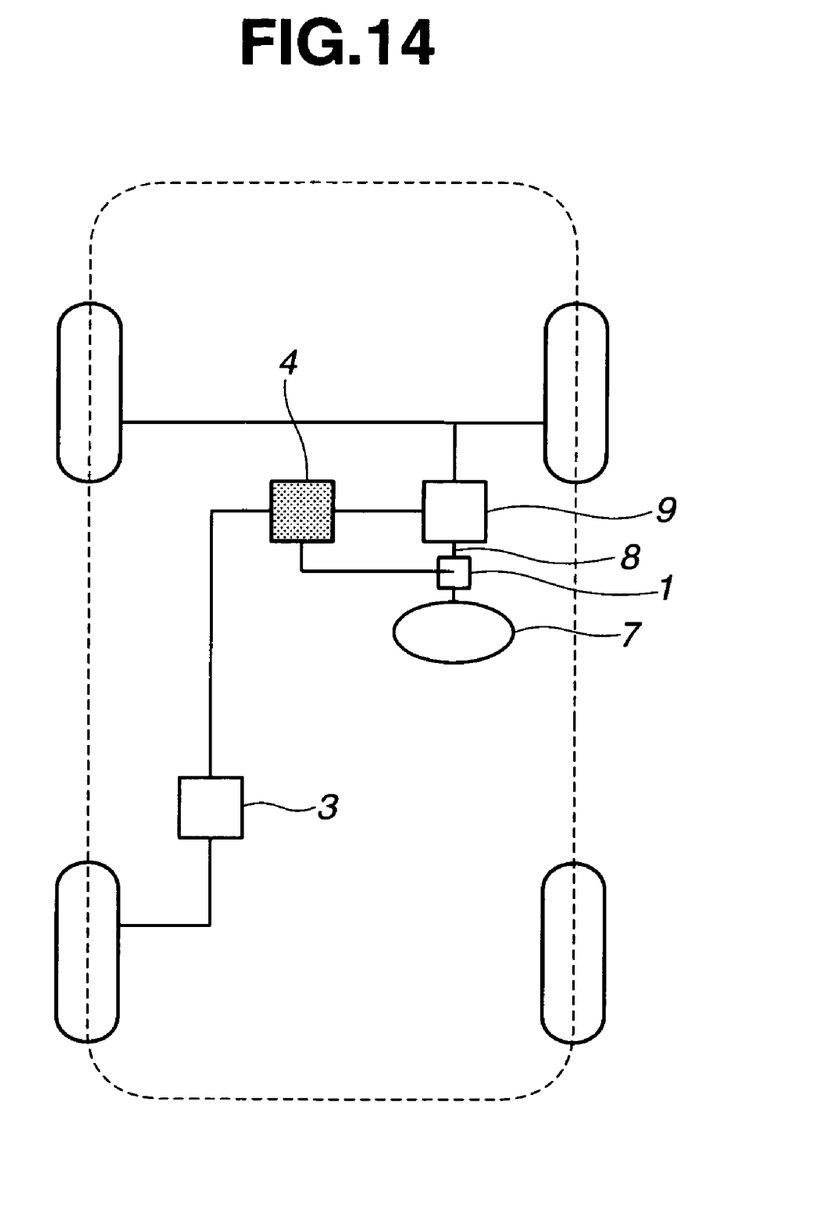
FIG. 14 is an illustrative view for illustrating a variation vehicle according to the embodiment.

FIG. 14 is an illustrative view for illustrating a variation vehicle according to the embodiment. The variable steering apparatus of FIG. 14 includes an electromotive power steering device arranged to assist a steering force, and to set a characteristic of the assist of the steering force based on the judgment result of the driving skill. Accordingly, it is possible to attain the steering apparatus to stabilize the movement of the vehicle at the steering. Moreover, the vehicle according to the embodiment includes a steering wheel; a steering angle detecting section configured to detect a steering angle of the steering wheel; a high order function calculating section configured to calculate a high order function of a third order or more, and which is for approximating a transition state of the steering angle based on the steering angle detected by the steering angle detecting section; and a skill judging section configured to judge a driving skill based on a comparative result between a transition state of the steering angle detected by the steering angle detecting section and the high order function calculated by the high order function calculating section. Accordingly, it is possible to achieve the judgment of the driving skill by the simple construction, relative to the method of judging the driving skill by using the road alignments.

A driving skill judging method according to the embodiment includes: detecting a steering angle of the vehicle; calculating a high order function of a third order or more, and which is for approximating a transition state of the steering angle based on the steering angle; and judging a driving skill based on a comparative result between a transition state of the steering angle detected by the steering angle detecting section and the high order function. Accordingly, it is possible to achieve the judgment of the driving skill by the relatively simple construction, relative to the method of judging the driving skill by using the road alignments.

This application is based on a prior Japanese Patent Application No. 2007-122135. The entire contents of the Japanese Patent Application No. 2007-122135 with a filing date of May 7, 2007 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A driving skill judging apparatus for a vehicle comprising:
   a steering angle detecting section configured to detect a steering angle of the vehicle;
   a high order function calculating section configured to calculate a high order function of a third order or more, and which is for approximating a transition state of the steering angle based on the steering angle detected by the steering angle detecting section; and
   a skill judging section configured to judge a driving skill based on a comparative result between a transition state of the steering angle detected by the steering angle detecting section and the high order function calculated by the high order function calculating section.

2. The driving skill judging apparatus as claimed in claim 1, wherein the high order function calculating section calculates a first high order function of a third order or more, and a second high order function of an order larger than the order of the first high order function; and the skill judging section is configured to judge the driving skill based on a difference between the transition state of the steering angle and the first high order function, and a difference between the transition state of the steering angle and the second high order function.

3. The driving skill judging apparatus as claimed in claim 2, wherein the high order function calculating section includes a steering start point detecting section configured to detect a steering start point indicating a point at which the steering is started, based on the record of the steering angle; a steering target point detecting section configured to detect a steering target point indicating a point at which the steering is returned, based on the record of the steering angle; and an approximation function calculating section configured to calculate the first high order function and the second high order function for approximating the transition state of the steering angle from the steering start point to the steering target point, based on the record of the steering angle.

4. The driving skill judging apparatus as claimed in claim 3, wherein the first high order function is a cubic function; and the second high order function is a quintic function.

5. The driving skill judging apparatus as claimed in claim 3, wherein the steering start point detecting section determines the steering start point when an absolute value of variation speed of the steering angle becomes greater than a third threshold value from a state in which the absolute value of the steering angle is smaller than a first threshold value and the absolute value of the variation speed of the steering angle is smaller than a second threshold value.

6. The driving skill judging apparatus as claimed in claim 3, wherein the steering target point sensing section determines the steering target point when the steering angle is maximized.

7. The driving skill judging apparatus as claimed in claim 2, wherein the high order function calculating section includes a steering target point detecting section configured to detect a steering target point indicating a point at which the steering is returned, based on the record of the steering angle; a steering end point detecting section configured to detect a steering end point indicating a point at which the steering is finished, based on the record of the steering angle; an approximation function calculating section configured to calculate the first high order function and the second high order function for approximating the transition state of the steering angle from the steering target point to the steering end point, based on the record of the steering angle.

8. The driving skill judging apparatus as claimed in claim 7, wherein the steering end point detecting section determines the steering end point when an absolute value of a variation quantity of the steering angle becomes smaller than a sixth threshold value from a state in which the absolute value of the steering angle is smaller than a fourth threshold value and the absolute value of the variation speed of the steering angle is greater than a fifth threshold value.

9. The driving skill judging apparatus as claimed in claim 1, wherein the high order function calculating section is configured to calculate the high order function by least square method, based on the steering angle.

10. The driving skill judging apparatus as claimed in claim 1, wherein the skill judging section is configured to judge the driving skill based on mean square of difference between the transition state of the steering angle and the high order function.

11. A variable steering apparatus for a vehicle comprising:
    a steering angle detecting section configured to detect a steering angle of the vehicle;
    a high order function calculating section configured to calculate a high order function of a third order or more, and which is for approximating a transition state of the steering angle based on the steering angle detected by the steering angle detecting section;

a skill judging section configured to judge a driving skill based on a comparative result between a transition state of the steering angle detected by the steering angle detecting section and the high order function calculated by the high order function calculating section; and a variable gear ratio steering device arranged to control a ratio between the steering angle and an actual steering angle based on the judgment result of the driving skill by the skill judging section.

12. A variable steering apparatus for a vehicle comprising:

a steering angle detecting section configured to detect a steering angle of the vehicle;

a high order function calculating section configured to calculate a high order function of a third order or more, and which is for approximating a transition state of the steering angle based on the steering angle detected by the steering angle detecting section;

a skill judging section configured to judge a driving skill based on a comparative result between a transition state of the steering angle detected by the steering angle detecting section and the high order function calculated by the high order function calculating section; and an electromotive power steering device arranged to assist a steering force, and to set a characteristic of the assist of the steering force based on the judgment result of the driving skill by the skill judgment section.

13. A vehicle comprising:

a steering wheel;

a steering angle detecting section configured to detect a steering angle of the steering wheel;

a high order function calculating section configured to calculate a high order function of a third order or more, and which is for approximating a transition state of the steering angle based on the steering angle detected by the steering angle detecting section; and a skill judging section configured to judge a driving skill based on a comparative result between a transition state of the steering angle detected by the steering angle detecting section and the high order function calculated by the high order function calculating section.

14. A driving skill judging method for a vehicle comprising:

detecting a steering angle of the vehicle;

calculating a high order function of a third order or more, and which is for approximating a transition state of the steering angle based on the steering angle; and judging a driving skill based on a comparative result between a transition state of the steering angle detected by the steering angle detecting section and the high order function.

* * * * *